(12) United States Patent
Bonazzoli

(10) Patent No.: US 6,629,487 B2
(45) Date of Patent: Oct. 7, 2003

(54) HIGH EFFICIENCY NON POLLUTING ENGINE

(76) Inventor: Amos Bonazzoli, Via VIII Marzo, 18, 26043 Persico Dosimo (Cremona) (IT)

( * ) Notice: Subject to any disclaimer, the term of this patent is extended or adjusted under 35 U.S.C. 154(b) by 15 days.

(21) Appl. No.: 09/874,079

(22) Filed: Jun. 5, 2001

(65) Prior Publication Data

US 2001/0049937 A1 Dec. 13, 2001

(30) Foreign Application Priority Data

Jun. 7, 2000 (IT) ...................................... MI2000A1265

(51) Int. Cl.⁷ ................................................ F01L 23/00
(52) U.S. Cl. ......................... 91/341 R; 91/273; 91/303; 91/325
(58) Field of Search .......................... 91/265, 269, 271, 91/272, 273, 303, 325, 341 R, 351

(56) References Cited

U.S. PATENT DOCUMENTS

| | | | | |
|---|---|---|---|---|
| 2,102,389 A | * | 12/1937 | Staley | 91/273 |
| 2,671,434 A | * | 3/1954 | Schmiedeskamp | 91/338 |
| 4,104,955 A | * | 8/1978 | Murphy | 91/273 |
| 4,168,655 A | * | 9/1979 | Kitrilakis et al. | 91/240 |
| 4,171,618 A | * | 10/1979 | Aegerter | 91/265 |
| 4,354,421 A | * | 10/1982 | Sims | 91/39 |
| 5,309,713 A | * | 5/1994 | Vassallo | 60/370 |

* cited by examiner

*Primary Examiner*—Edward K. Look
*Assistant Examiner*—Michael Leslie
(74) *Attorney, Agent, or Firm*—Hedman & Costigan, P.C.

(57) ABSTRACT

A high efficiency not polluting engine comprises at least a cylinder and at least a piston movable therein, the cylinder including, alternately, a pre-chamber in the cylinder head and/or a chamber for a direct injection mode of operation, the pre-chamber forming a plenum chamber having a size proportional to the swept volume of the engine and to the power to be obtained, the pre-chamber of the chamber being continuously supplied from the outside by pressurized air at a variable pressure controlled by at least two adjustment controls.

3 Claims, 8 Drawing Sheets

HIGH EFFICIENCY NON POLLUTING ENGINE

BACKGROUND OF THE INVENTION

The present invention relates to a high efficiency piston engine, which is driven either by pressurized air or other pressurizable gas or fluid supplied from a source arranged outside of the engine.

As is known, high efficiency, non-polluting engines are increasingly required and, to meet this requirement, several fluid-operated engine constructions have been already proposed.

However, prior fluid-operated engines for motor vehicles are rather polluting and consume a comparatively high amount of fuel.

Thus, it would be desirable to provide a very simple constructional approach which, as applied to a piston engine, would provide said engine with a performance not less than that of an internal combustion engine.

SUMMARY OF THE INVENTION

Accordingly, the aim of the present invention is to provide a high efficiency non-polluting fluid-operated piston engine.

Within the scope of the above mentioned aim, a main object of the invention is to provide such an engine which is very reliable in operation and which can be used in a broad range of motor vehicles, for a lot of commercial, private and other operations.

According to one aspect of the present invention, the above mentioned aim and objects, as well as yet other objects, which will become more apparent hereinafter, are achieved by a high efficiency piston engine comprising at least a cylinder and at least a piston movable in said cylinder, characterized in that said cylinder has a cylinder head including a pre-chamber forming a plenum chamber having a size proportional to the swept volume of said engine and to a power to be obtained thereby.

Said pre-chamber is continuously supplied from the outside by pressurized air or other pressurizable gas, at a variable pressure which is provided by at least two adjustment operations or controls.

BRIEF DESCRIPTION OF THE DRAWINGS

Further characteristics and advantages of the present invention will become more apparent hereinafter from the following disclosure of a preferred, though not exclusive, embodiment of the invention, which is illustrated, by way of an indicative, but not limitative, example in the accompanying drawings, where:

FIG. 5 showing, in an out of scale schematic representation, the pressurized air tanks and pressure adjusting means of the piston engine according to the invention;

DESCRIPTION OF THE PREFERRED EMBODIMENT

Figure 1:
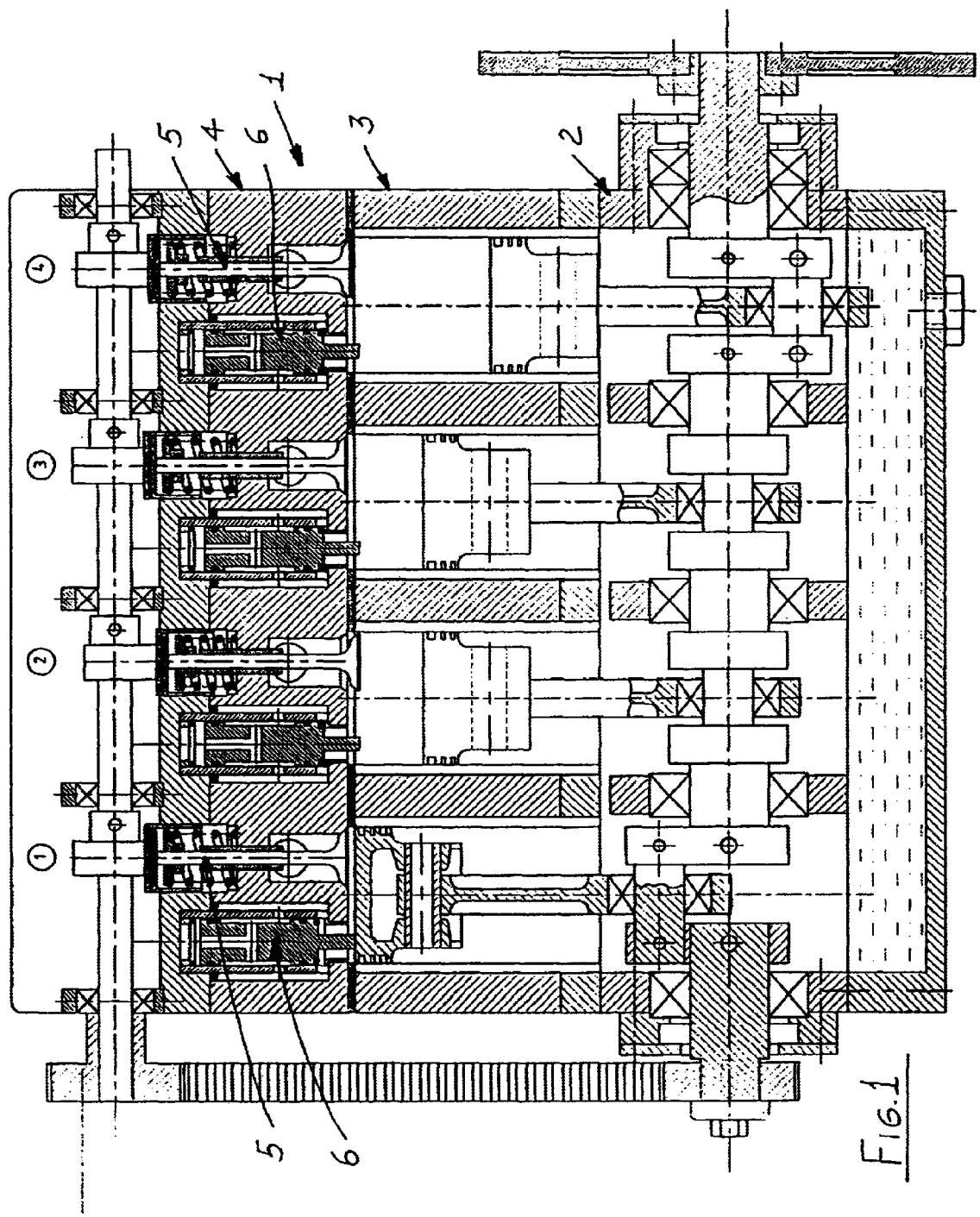
FIG. 1 is a side cross-sectioned view of a prototype of a piston engine according to the present invention.
Figure 2:
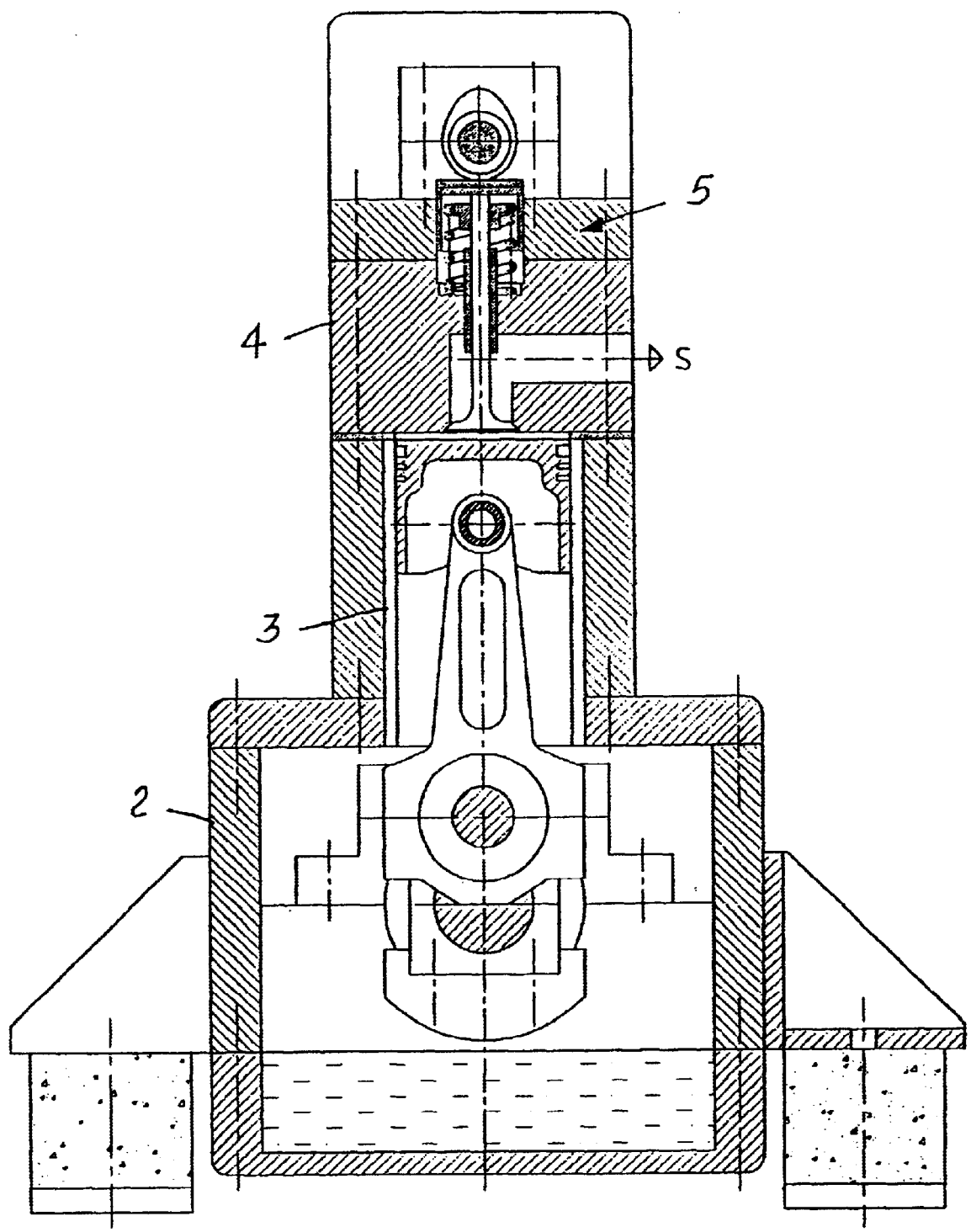
FIG. 2 is an enlarged partial front cross-sectional view of the engine according to the invention, and clearly illustrating an outlet valve thereof.
Figure 3:
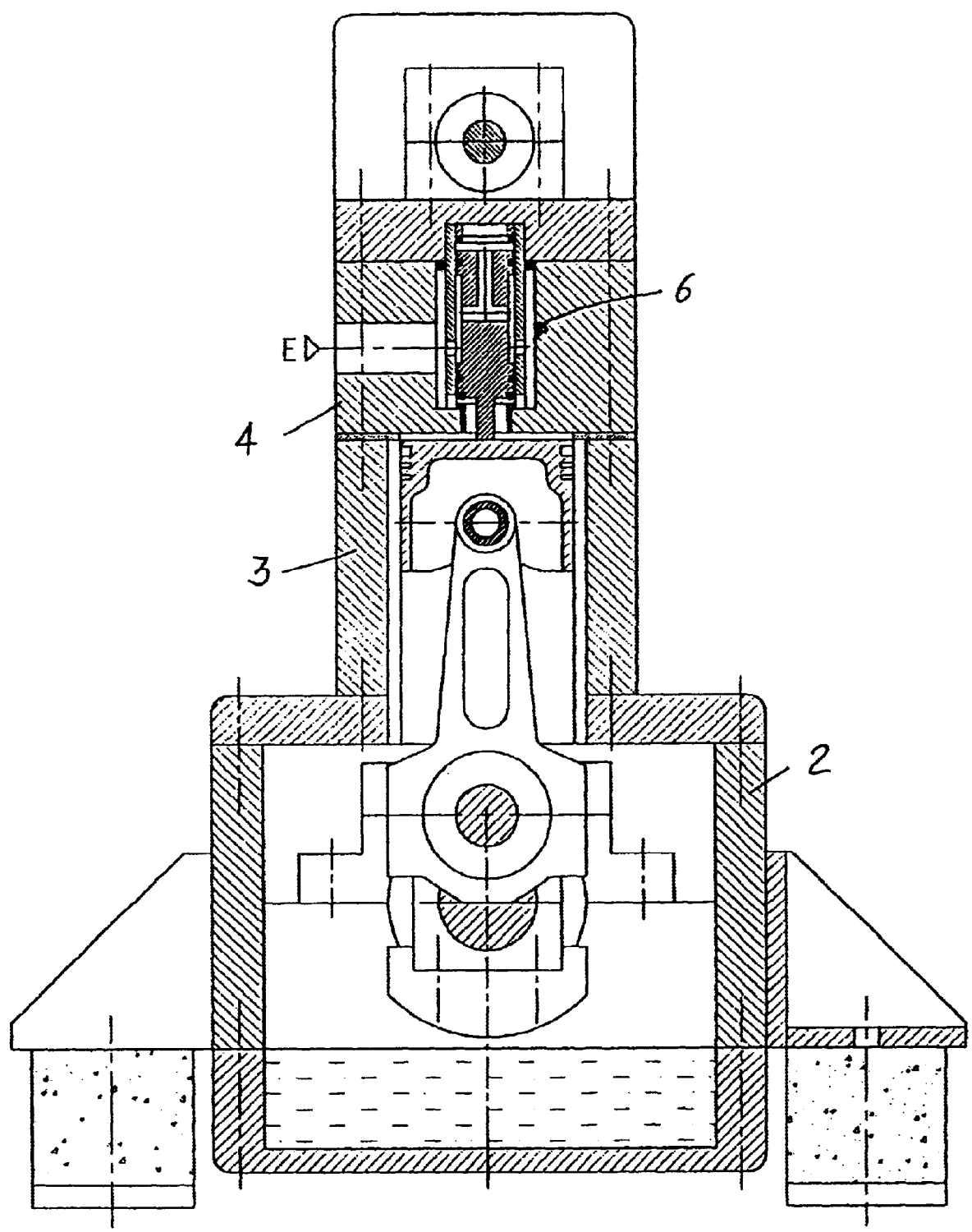
FIG. 3 is an enlarged partial front cross-sectional view of the engine according to the invention, and clearly showing an inlet valve thereof.

With reference to the number references of the above mentioned figures, the high efficiency piston engine according to the present invention, which has been generally indicated by the reference number 1, comprises, as main components thereof, an engine block 2, including one or more cylinders 3, each having a cylinder head 4.

The head 4 of each cylinder comprises at least an outlet valve 5 and at least an inlet or injection valve 6, which can be communicated with a space 7 formed between the tip surface or head 8 of the piston, or plunger, 9, and the bottom surface 10 of the cylinder head 4.

Figure 4:
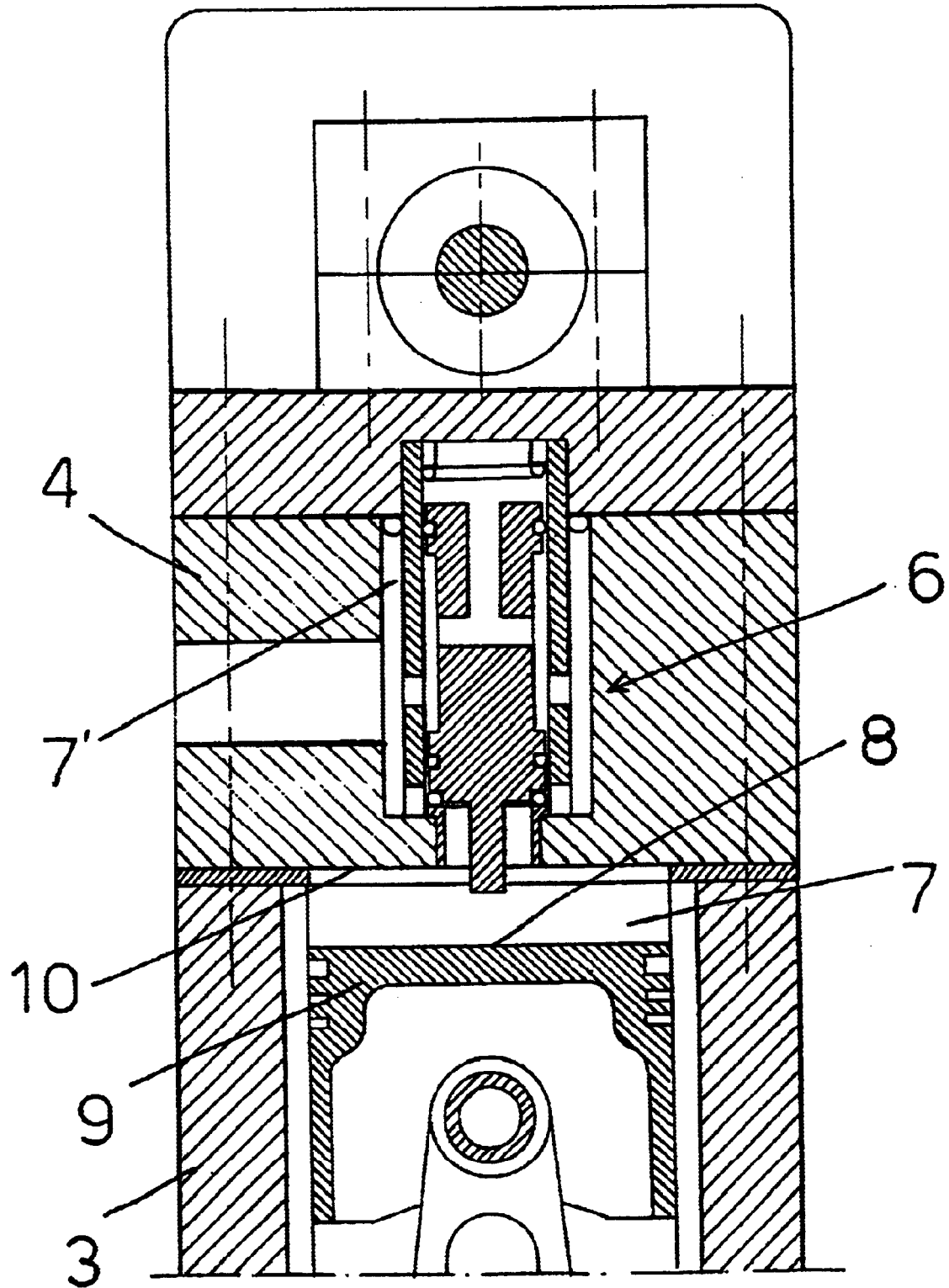
FIGS. 4, 5, 6, and 7 are further enlarged partial front cross-sectional view of the inlet or injection valve shown in several operating steps thereof, according to the invention.
Figure 5:
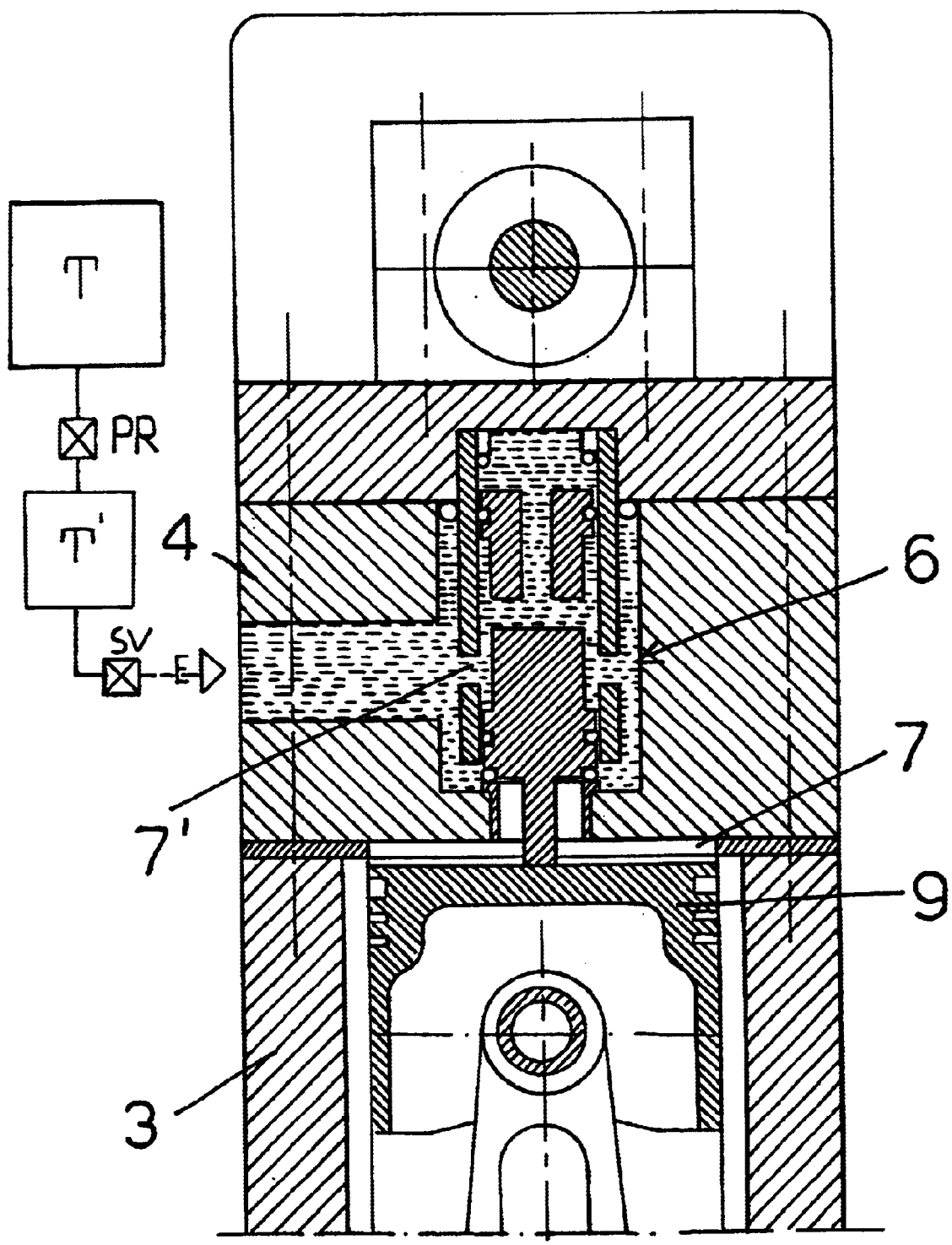
Figure 6:
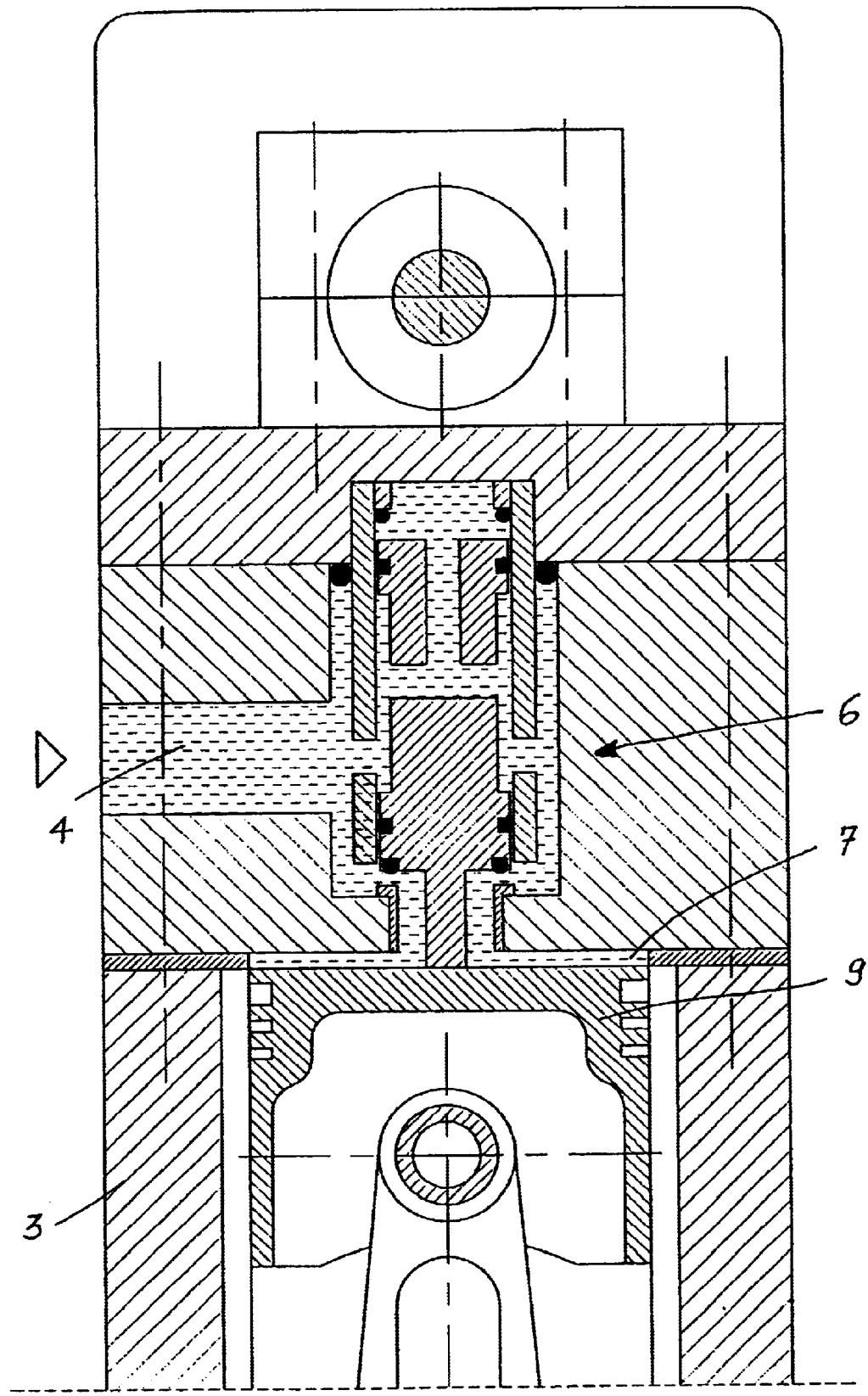
Figure 7:
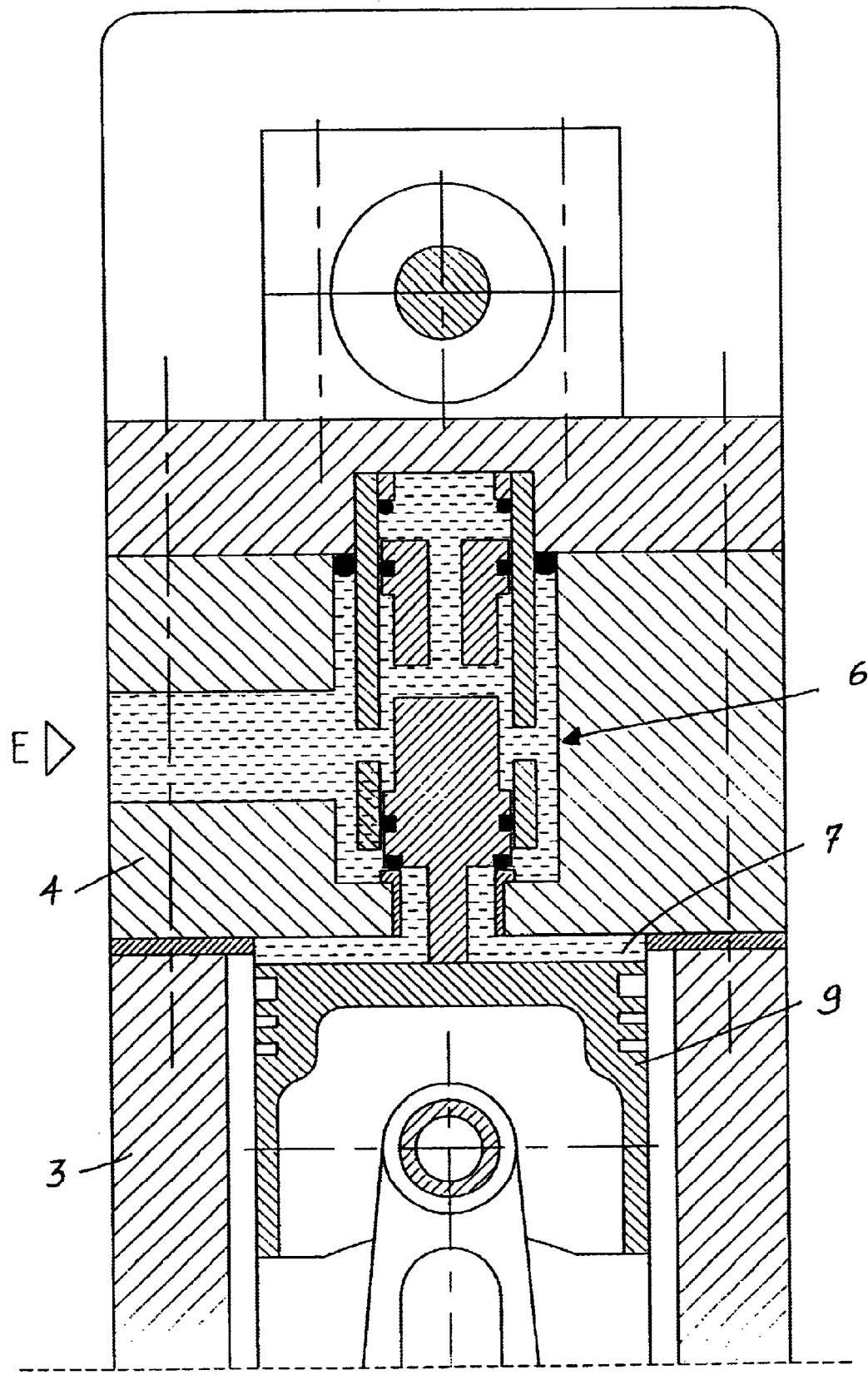
Figure 9:
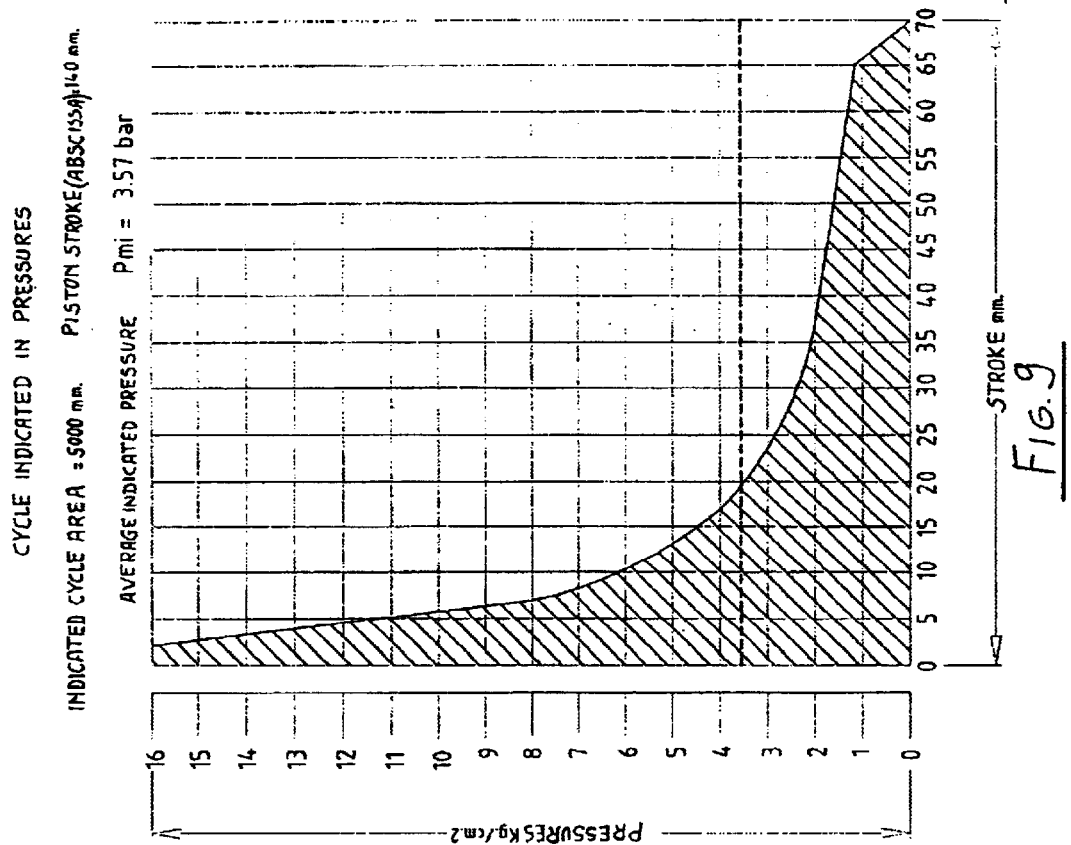
FIG. 9 is a diagram showing the pressure-piston stroke relationship.
Figure 8:
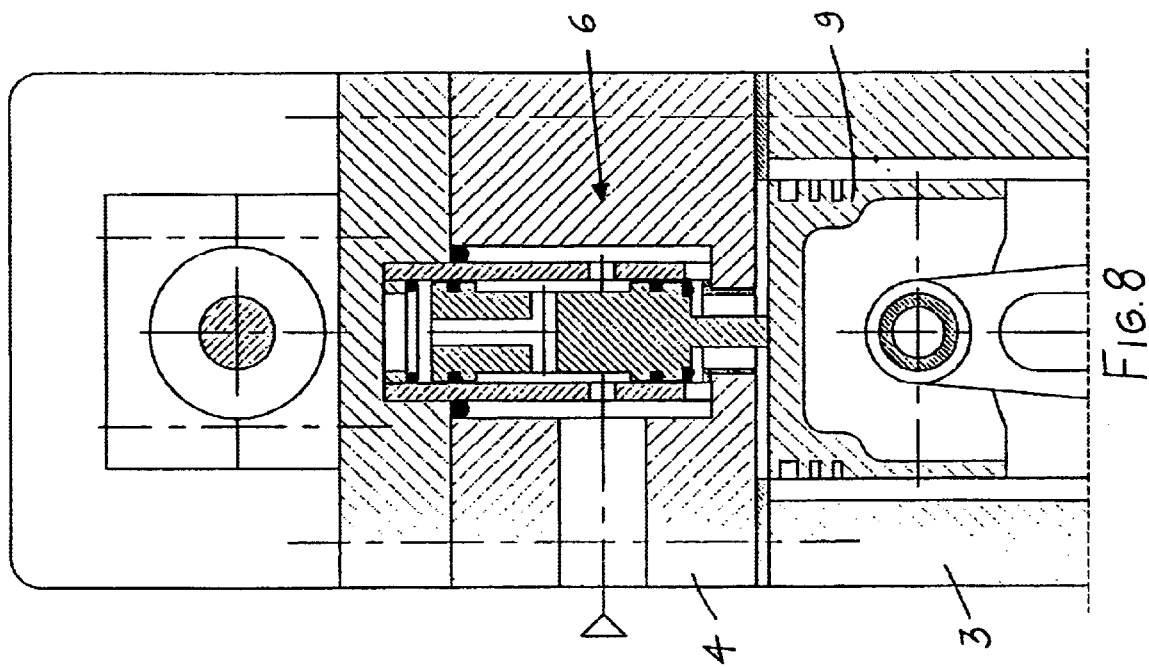
FIG. 8 is an enlarged, partial cross-sectional view of the engine according to the invention, and clearly showing the inlet or injection valve thereof.

With reference to FIGS. 4, 5, 6, and 7 the piston engine, according to this preferred, though not exclusive, embodiment of the invention, operates as follows:

the pressurized air is injected at a given pressure (X) into the space between the cylinder head 4 and the piston head 8.

This pressurized air injection is automatically performed by exploiting the stoke or displacement of the piston head 8, which, in the exhausting stroke, before arriving at the top dead center (PMS) causes the valve to be pressure opened.

Thus, the valve 6 will case the cylinder head pre-chamber 7', which is continuously held at said pressure X, to communicate with the piston head 8, which, in the meanwhile, will be arrived at said top dead center.

The valve 6, which has suitably faceted valve stem, facilitates a high speed flow of said pressurized air or other pressurizable gas between the mentioned portions.

At the start of the expanding stroke, the valve 6 will be still in an open condition and it will be definitely closed as the piston head 8 will be displaced by a stroke of about 5 mm beyond the top dead center, in the shown exemplary embodiment.

A high pressure tank T supplies, through a first pressure reducing unit PR, a second low pressure tank T' having a volume of few liters, and a variable pressure (for example 15/20 bars) depending on the engine swept volume and on the maximum power to be obtained.

Through a solenoid valve, SV, said small tank T will continuously supply, for example by, a two-adjustment mode of operation, the mentioned pre-chamber 7' inside the cylinder head.

Alternately, it would be possible to directly supply the cylinder chamber or space 7.

The first of the two mentioned adjustments (which is a fixed adjustment) controls the minimum RPM of the engine, whereas the second adjustment is a variable one and bypasses the first, while controlling the acceleration.

It has been found that the invention fully achieves its intended aim and objects.

Actually, a high efficiency non polluting engine has been provided.

In order to better understand the advantages provided by the invention, the following practical example would be useful.

by a piston having a bore of 10 cm and a stroke of 8 cm, a constant pressure of 1 bar is introduced into the cylinder, thereby providing on the piston head, from the start to the end of the stroke thereof a pushing force (78.5 kg) with the cylinder at an end pressure of 1 bar and with a pressurized air consume corresponding to 0.628 liters for each stroke.

If the pressurized air used in the first 5 mm of the stroke of the piston is introduced, then in that space we will have a pressure of 16 bars, with a start pushing force on the piston head of about 1.256 kg, the end pushing force and air consume for each stroke being held unchanged with respect to the first example.

Accordingly, in the first case, we will have an average effective pressure, with respect to the stroke, of 1 bar and, in the second case, a calculated average effective pressure of about 4 bars.

Since said average effective pressure is a very important parameter in calculating the engine power, the great advantage of the present invention should be self-evident.

In practicing the invention, the used supply and outlet systems, as well as the contingent size can be any, depending on requirements and the status of the art.

What is claimed is:

1. A high efficiency non polluting piston engine, including at least a cylinder and at least a piston movable in said cylinder, said piston having a piston head and said cylinder having a cylinder head, said at least a cylinder comprising pre-chamber means in said cylinder head, said pre-chamber means having a size proportional to a swept volume and power of said engine, and pressurized air supplying means for supplying pressurized air to said pre-chamber means through inlet valve means arranged in said cylinder and controlled by said piston, said inlet valve means communicating said pre-chamber means with said piston head and being opened at an exhausting stroke of said piston before a top dead center of said piston and closed after said top dead center, wherein said engine comprises expanded air exhausting valve means in said cylinder head.

2. An engine according to claim 1, said pressurized air being directly continuously injected into a space between said piston head and said cylinder head, wherein said pressurized air supplying means comprise a high pressure tank coupled through a pressure reducing unit to a small volume low pressure tank having and a variable pressure said low pressure tank being coupled to solenoid valve means.

3. An engine according to claim 2, wherein said low pressure tank has a pressure of 15 to 20 bar therein.

* * * * *